US008776092B2

(12) United States Patent
Plache et al.

(10) Patent No.: US 8,776,092 B2
(45) Date of Patent: Jul. 8, 2014

(54) MULTIPLE INTERFACE SUPPORT

(75) Inventors: Kenneth Plache, Scottsdale, AZ (US); Daniel B. Seger, III, Kennesaw, GA (US); Raymond Staron, Chagrin Falls, OH (US); Robert J. Kretschmann, Bay Village, OH (US); Taryl Jasper, South Euclid, OH (US); James Harry Jarrett, Baltimore, MD (US); Russell Brandes, Brunswick, OH (US); Ronald Bliss, Twinsburg, OH (US); Michael Kalan, Highland Heights, OH (US); Subbian Govindaraj, Solon, OH (US); Kenwood Hall, Hudson, OH (US); Douglas J. Reichard, Fairview, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 900 days.

(21) Appl. No.: 12/893,550

(22) Filed: Sep. 29, 2010

(65) Prior Publication Data

US 2011/0022827 A1    Jan. 27, 2011

Related U.S. Application Data

(63) Continuation-in-part of application No. 11/536,715, filed on Sep. 29, 2006, now Pat. No. 7,856,279, and a continuation-in-part of application No. 11/536,746, filed on Sep. 29, 2006, now Pat. No. 7,835,805, and a continuation-in-part of application No. 11/536,760, filed on Sep. 29, 2006, now Pat. No. 7,912,560, and a continuation-in-part of application No. 11/536,791, filed on Sep. 29, 2006, now abandoned, and a continuation-in-part of application No. 12/241,319, filed on Sep. 30, 2008, and a continuation-in-part of application No. 12/241,327, filed on Sep. 30, 2008, now Pat. No. 8,265,775, and a continuation-in-part of application No. 12/241,342, filed on Sep. 30, 2008, now Pat. No. 8,041,435.

(51) Int. Cl.
*G06F 3/00* (2006.01)
*G06F 9/44* (2006.01)

(52) U.S. Cl.
USPC ............ 719/328; 719/330; 717/168; 717/170

(58) Field of Classification Search
None
See application file for complete search history.

(56) References Cited

U.S. PATENT DOCUMENTS

| 5,485,620 A | 1/1996 | Sadre et al. |
| 5,522,066 A | 5/1996 | Lu |

(Continued)

FOREIGN PATENT DOCUMENTS

| CN | 101201598 | 6/2008 |
| CN | 101201599 | 6/2008 |

(Continued)

OTHER PUBLICATIONS

OA dated Oct. 24, 2011 for U.S. Appl. No. 11/536,791, 35 pages.

(Continued)

*Primary Examiner* — Qing Wu
(74) *Attorney, Agent, or Firm* — Amin, Turocy & Watson, LLP

(57) ABSTRACT

Aspects describe multiple interface support that provides dynamic switching between new and old interface revisions. A first interface application is selected from a set of alternative interface applications for an industrial automation system. Support for each interface application included in the set of alternative interface applications is provided. A second interface application is downloaded and associated with the first interface application. The second interface application is enabled during runtime. If needed, the second interface application can be selectively disabled and an operation resumed with the first interface application.

20 Claims, 10 Drawing Sheets

(56) References Cited

U.S. PATENT DOCUMENTS

| | | | |
|---|---|---|---|
| 5,530,861 A | 6/1996 | Diamant et al. |
| 5,812,394 A | 9/1998 | Lewis et al. |
| 5,907,704 A | 5/1999 | Gudmundson et al. |
| 5,946,681 A | 8/1999 | Shortrer |
| 6,067,299 A | 5/2000 | DuRee |
| 6,085,222 A | 7/2000 | Fujino et al. |
| 6,104,962 A | 8/2000 | Sastry |
| 6,154,684 A | 11/2000 | Schwenke et al. |
| 6,269,254 B1 | 7/2001 | Mathis |
| 6,437,805 B1 | 8/2002 | Sojoodi et al. |
| 6,477,435 B1 | 11/2002 | Ryan |
| 6,505,247 B1 | 1/2003 | Steger et al. |
| 6,539,271 B2 | 3/2003 | Lech et al. |
| 6,553,268 B1 | 4/2003 | Schwenke et al. |
| 6,615,166 B1 | 9/2003 | Guheen et al. |
| 6,618,856 B2 | 9/2003 | Coburn et al. |
| 6,718,533 B1 | 4/2004 | Schneider et al. |
| 6,868,538 B1 | 3/2005 | Nixon et al. |
| 7,016,759 B2 | 3/2006 | Kaever et al. |
| 7,020,697 B1 | 3/2006 | Goodman et al. |
| 7,043,311 B2 | 5/2006 | Nixon et al. |
| 7,058,712 B1 | 6/2006 | Vasko et al. |
| 7,080,066 B1 | 7/2006 | Scheurich et al. |
| 7,089,530 B1 | 8/2006 | Dardinski et al. |
| 7,096,465 B1 | 8/2006 | Dardinski et al. |
| 7,146,232 B2 | 12/2006 | Staron et al. |
| 7,159,007 B2 | 1/2007 | Stawikowski et al. |
| 7,194,446 B1 | 3/2007 | Bromley et al. |
| 7,197,493 B2 | 3/2007 | Ashby et al. |
| 7,225,037 B2 | 5/2007 | Shani |
| 7,233,830 B1 | 6/2007 | Callaghan |
| 7,266,677 B1 | 9/2007 | Bromley et al. |
| 7,272,815 B1 | 9/2007 | Eldridge et al. |
| 7,363,338 B2 | 4/2008 | Kaakani et al. |
| 7,395,122 B2 | 7/2008 | Kreidler et al. |
| 7,418,305 B2 | 8/2008 | Buesgen et al. |
| 7,505,817 B2 | 3/2009 | McDaniel et al. |
| 7,509,249 B2 | 3/2009 | Britt et al. |
| 7,627,385 B2 | 12/2009 | McGreevy et al. |
| 7,653,008 B2 | 1/2010 | Patrick et al. |
| 7,676,279 B2 | 3/2010 | Hood et al. |
| 7,970,830 B2 | 6/2011 | Staggs et al. |
| 8,214,455 B2 | 7/2012 | Baier et al. |
| 2001/0034557 A1 | 10/2001 | Hudson et al. |
| 2001/0052113 A1 | 12/2001 | Hearne et al. |
| 2002/0059272 A1 | 5/2002 | Porter |
| 2002/0156548 A1 | 10/2002 | Arackaparambil et al. |
| 2003/0023336 A1 | 1/2003 | Kreidler et al. |
| 2003/0045950 A1 | 3/2003 | Bronikowski et al. |
| 2003/0150927 A1 | 8/2003 | Rosen |
| 2003/0163656 A1 | 8/2003 | Ganton |
| 2004/0015568 A1 | 1/2004 | Kaakani et al. |
| 2004/0139427 A1 | 7/2004 | Garvey |
| 2004/0199925 A1 | 10/2004 | Nixon et al. |
| 2004/0230328 A1 | 11/2004 | Armstrong et al. |
| 2005/0080788 A1 | 4/2005 | Murata |
| 2005/0125735 A1 | 6/2005 | Cohen et al. |
| 2005/0229004 A1 | 10/2005 | Callaghan |
| 2005/0234873 A1 | 10/2005 | Milligan |
| 2005/0256735 A1 | 11/2005 | Bayne |
| 2006/0031855 A1* | 2/2006 | Smithline ............... 719/328 |
| 2006/0037008 A1 | 2/2006 | Stelzer et al. |
| 2006/0059127 A1 | 3/2006 | Berry et al. |
| 2006/0179032 A1 | 8/2006 | Gottsman et al. |
| 2006/0206448 A1 | 9/2006 | Hyder et al. |
| 2006/0212146 A1 | 9/2006 | Johnson et al. |
| 2006/0259954 A1 | 11/2006 | Patrick et al. |
| 2006/0271505 A1 | 11/2006 | Vierich et al. |
| 2006/0277289 A1 | 12/2006 | Bayliss et al. |
| 2007/0011281 A1 | 1/2007 | Jhoney et al. |
| 2007/0055757 A1 | 3/2007 | Mairs et al. |
| 2007/0073850 A1 | 3/2007 | Callaghan et al. |
| 2007/0089063 A1 | 4/2007 | Breyer |
| 2007/0124475 A1 | 5/2007 | Syed et al. |
| 2007/0142941 A1 | 6/2007 | McGreevy et al. |
| 2007/0250630 A1 | 10/2007 | Blanding |
| 2007/0256051 A1 | 11/2007 | Rojer |
| 2008/0022151 A1 | 1/2008 | Stange et al. |
| 2008/0040477 A1 | 2/2008 | Johnson et al. |
| 2008/0079558 A1 | 4/2008 | Dorgelo et al. |
| 2008/0082186 A1 | 4/2008 | Hood et al. |
| 2008/0082577 A1 | 4/2008 | Hood |
| 2008/0082636 A1 | 4/2008 | Hofmann et al. |
| 2008/0082959 A1 | 4/2008 | Fowler et al. |
| 2008/0092131 A1* | 4/2008 | McIntyre et al. ............ 717/172 |
| 2008/0127065 A1 | 5/2008 | Bryant et al. |
| 2008/0140230 A1 | 6/2008 | Bromley |
| 2008/0201297 A1 | 8/2008 | Choi et al. |
| 2008/0208361 A1 | 8/2008 | Grgic |
| 2008/0208368 A1 | 8/2008 | Grgic |
| 2008/0284649 A1 | 11/2008 | Bratthall et al. |
| 2009/0083705 A1 | 3/2009 | Phillips et al. |
| 2009/0083843 A1 | 3/2009 | Wilkinson et al. |
| 2009/0328012 A1 | 12/2009 | Aharoni et al. |
| 2010/0088104 A1 | 4/2010 | DeRemer et al. |
| 2010/0192125 A1* | 7/2010 | Son et al. ............... 717/120 |

FOREIGN PATENT DOCUMENTS

| | | |
|---|---|---|
| DE | 19614789 C1 | 9/1997 |
| DE | 101 29 564 A1 | 9/2002 |
| EP | 1276026 A | 1/2003 |
| EP | 1422619 A | 5/2004 |
| EP | 1 772 785 A | 4/2007 |
| EP | 1 906 276 A2 | 4/2008 |
| EP | 1 936 496 A1 | 6/2008 |
| EP | 1 906 276 A3 | 12/2009 |
| EP | 2 169 597 A1 | 3/2010 |
| EP | 2 169 598 A1 | 3/2010 |
| EP | 2 169 599 A1 | 3/2010 |
| WO | 0195041 A1 | 12/2001 |
| WO | 02/31607 A | 4/2002 |
| WO | 2004086160 A1 | 10/2004 |

OTHER PUBLICATIONS

OA dated Dec. 16, 2010 for U.S. Appl. No. 11/536,818, 50 pages.
OA dated Aug. 20, 2012 for U.S. Appl. No. 12/893,545, 52 pages.
Article entitled "Viewanyware solutions from Rockwell Automation", by SAIMC, dated May 2001.
Article entitled "Automation Today", by Rockwell, dated Feb. 2001.
Article entitled "ViewAnyWare" by Rockwell, dated Jun. 10, 2004.
OA dated Aug. 2, 2012 for U.S. Appl. No. 12/893,366, 50 pages.
OA dated Jan. 25, 2012 for U.S. Appl. No. 12/241,327, 45 pages.
OA dated Feb. 4, 2013 for U.S. Appl. No. 12/893,545, 36 pages.
OA dated Apr. 25, 2013 for U.S. Appl. No. 12/893,804, 39 pages.
OA dated Feb. 1, 2013 for U.S. Appl. No. 12/893,366, 20 pages.
OA dated Mar. 22, 2011 for U.S. Appl. No. 12/241,319, 23 pages.
OA dated Feb. 24, 2011 for U.S. Appl. No. 12/241,342, 35 pages.
OA dated May 10, 2011 for U.S. Appl. No. 11/536,791, 46 pages.
European Search Report for European Patent Application No. EP07117140, dated May 7, 2008, 8 pages.
Sweet, et al. Managing Technology Change in Industrial Automation. Proceedings of the Third IEEE Conference on Control Applications, Aug. 24-26, 1994, pp. 3-6, vol. 1. An ABB Overview of Research Priorities.
Maaref, et al. Communication System for Industrial Automation, Proceedings of the IEEE International Symposium on Industrial Electronics, Jul. 7-11, 1997. Laboratoire Logiciels System Reseaux-Image, IEEE, pp. 1286-1291.
OA Dated Oct. 6, 2008 for U.S. Appl. No. 11/536,715, 23 pages.
OA Dated Oct. 29, 2008 for U.S. Appl. No. 11/536,746, 23 pages.
OA Dated Oct. 29, 2008 for U.S. Appl. No. 11/536,791, 43 pages.
OA Dated Oct. 7, 2008 for U.S. Appl. No. 11/536,760, 33 pages.
OA Dated Jan. 9, 2009 for U.S. Appl. No. 11/536,827, 18 pages.
OA dated Apr. 13, 2009 for U.S. Appl. No. 11/536,746, 23 pages.
OA dated Mar. 24, 2009 for U.S. Appl. No. 11/536,715, 38 pages.
OA dated Apr. 23, 2009 for U.S. Appl. No. 11/536,760, 22 pages.
OA dated Apr. 17, 2009 for U.S. Appl. No. 11/536,791, 37 pages.
OA dated Aug. 24, 2009 for U.S. Appl. No. 11/536,746, 18 pages.
OA dated Aug. 21, 2009 for U.S. Appl. No. 11/536,760, 17 pages.

(56) References Cited

OTHER PUBLICATIONS

OA dated Aug. 6, 2009 for U.S. Appl. No. 11/536,791, 38 pages.
OA dated Jun. 23, 2009 for U.S. Appl. No. 11/536,827, 22 pages.
OA dated Oct. 20, 2009 for U.S. Appl. No. 11/536,715, 41 pages.
European Search Report dated Nov. 20, 2009 for European Application No. EP 07 11 7192, 9 pages.
"SIMATEC, Working with STEP V5.1, Edition Aug. 2000, A5E00069681-03". Aug. 2000, Siemens, D-90327, Nurnberg, DE, XP002554626.
Fayad, et al. "HMI as a Maintainance tool." Advances in Instrumentation and Control, Instrument Society of America, Research Triangle Park, US, vol. 2, part 1, Jan. 1, 1998, pp. 119-134, XP000875207, ISSN: 1054-0032, p. 124, last paragraph—p. 133, last paragraph.
OA dated Jan. 26, 2010 for U.S. Appl. No. 11/536,791, 39 pages.
OA dated Mar. 8, 2010 for U.S. Appl. No. 11/536,760, 19 pages.
OA dated Mar. 8, 2010 for U.S. Appl. No. 11/536,746, 21 pages.
Raymond Staron, et al. Use of an Agent Type Library for the Design and Implementation of Highly Flexible Control Systems. Last accessed on Oct. 10, 2008, 6 pages.
Marvin J. Schwenke, et al. Specifying a Control Program with High Level Graphical Editors. (c) 2001 Society of Automotive Engineers, Inc. Last accessed on Oct. 10, 2008, 9 pages.
Marvin J. Schwenke, et al. Use of a Type Library to Speed Up PLC Program Design and Commissioning. Last accessed on Oct. 10, 2008, 13 pages.
European Search Report for European Application No. 09171807.2-1238 dated Feb. 4, 2008, 7 pages.
European Search Report on European Patent Application No. EP09171802.3-1238, dated Jan. 29, 2010, 6 pages.
European Search Report for European Application No. 09171806.4-1238 dated Apr. 2, 2010, 8 pages.
European Search Report dated Jan. 25, 2010 for European Application No. EP09171807, 2 pages.
OA dated May 14, 2010 for U.S. Appl. No. 11/536,715, 49 pages.
"Datastream 7i for SQL Server"; Jun. 13, 2006, Infor, 2 pages.
European Search Report Dated Jan. 21, 2010 for European Application No. EP09171802, 2 pages.
European Search Report Dated Jan. 27, 2010 for European Application No. EP09171806, 2 pages.
OA dated Sep. 17, 2010 for U.S. Appl. No. 12/241,319, 32 pages.
Rockwell Automation. "ViewAnyWare: Picture the Reality", 2004, published online at [http://literature.rockwellautomation.com/idc/groups/literature/documents/br/euvaw-br001_-en-p.pdf], retrieved Jan. 29, 2014, 4 pages.
Office Action dated Jul. 19, 2013 for U.S. Appl. No. 12/241,319, 42 pages.
Notice of Allowance dated Sep. 13, 2013 for U.S. Appl. No. 12/893,804, 25 pages.
Office Action dated Dec. 5, 2013 for U.S. Appl. No. 12/893,883, 58 pages.
Office Action dated Feb. 13, 2014 for U.S. Appl. No. 12/241,319, 24 pages.

\* cited by examiner

MULTIPLE INTERFACE SUPPORT

CROSS-REFERENCE TO RELATED APPLICATIONS

This application is a Continuation-in-Part of co-pending U.S. patent application Ser. No. 11/536,715, entitled "MODULE STRUCTURE AND USE FOR INDUSTRIAL CONTROL SYSTEMS," filed on Sep. 29, 2006; this application is also a Continuation-in-Part of co-pending U.S. patent application Ser. No. 11/536,746, entitled "HMI VIEWS OF MODULES FOR INDUSTRIAL CONTROL SYSTEMS," filed on Sep. 29, 2006; this application is also a Continuation-in-Part of co-pending U.S. patent application Ser. No. 11/536,760, entitled "MODULE AND CONTROLLER OPERATION FOR INDUSTRIAL CONTROL SYSTEMS," filed on Sep. 29, 2006; this application is also a Continuation-in-Part of co-pending U.S. patent application Ser. No. 11/536,791, entitled "MODULE CLASSIFICATION AND SEARCHING FOR INDUSTRIAL CONTROL SYSTEMS," filed on Sep. 29, 2006; this application is also a Continuation-in-Part of co-pending U.S. patent application Ser. No. 12/241,319, entitled "MODULE AND HOST MATCHING," filed on Sep. 30, 2008; this application is also a Continuation-in-Part of co-pending U.S. patent application Ser. No. 12/241,327, entitled "MODULE PUBLICATION AND DISCOVERY," filed on Sep. 30, 2008; this application is also a Continuation-in-Part of co-pending U.S. patent application Ser. No. 12/241,342, entitled "MODULE DYNAMIC HOSTING," filed on Sep. 30, 2008, the entireties of which are incorporated herein by reference.

TECHNICAL FIELD

The subject disclosure relates generally to industrial control systems and more particularly to modular automation within industrial control systems.

BACKGROUND

Industrial control systems can employ complex mechanical, electronic, electro-mechanical, and/or robotic machinery to perform various automated mechanical and/or electrical functions. Examples of machinery include industrial motors, pumps, conveyors, escalators, drills, refrigeration systems, and so forth. An industrial control system can utilize one or more control devices to activate or deactivate the machinery and/or to determine an appropriate level of activation for the machinery (e.g., an amount of current to supply to a variable input motor). Additionally, the control devices can be associated with logical program code that determines an appropriate time, degree, manner, and other criteria for operation of the machinery. For example, the determination can be based on various circumstances, including an output of another device, a reading of an optical sensor, an electronic measurement, a movement, a number of rotations of a device, and so on.

The machinery can be controlled by at least one industrial controller, such as, for example, programmable logic controllers. The industrial controllers can also communicate with higher level computing systems or servers that aggregate data from the controllers and help to manage day-to-day activities of an enterprise. As systems have become more complex, however, communications and functional cooperation between components of the industrial automation system has become a challenge. For instance, when users purchase multiple products from one or more vendors, there is often limited interoperability and consistency between such products. Software and control engineers must then learn each product and how the components interact with each other. Limited product and component consistency suggest that techniques engineers learn for one product do not necessarily carry over to other implementations.

Often, integration of products in the industrial automation system is complex and difficult to manage. Process and control engineers cannot easily code and configure their respective components without concern for other system components, which may have different manufacturers and different platforms.

Another problem with integration of products is that process and control engineers focus on underlying technical details, including implementation and glue logic, rather than the application level concerns, for example process information. For instance, an engineer may decide to automate a manual section of their plant. The design may start at a high level but soon becomes a series of discussions regarding nonfunctional requirements e.g., distributed component object model (DCOM), transmission control protocol (TCP), transaction rates, and the like. While these nonfunctional requirements are important, the design of functional requirements is where the true value is to the designer or end user. Thus, the engineer would prefer to focus on functional requirements (equipment control, product flow control, and so forth) providing direct improvements in value rather than dealing with superfluous technology issues.

In another case, system design does not sufficiently enable trade-offs between overhead burden (memory footprint, CPU (central processing unit) cycles, and so forth) and application coupling. For instance, processing load should be distributed across the system in accordance with system capabilities. Thus, if one part of the system is shut down, alternative processing capability should be in place to allow production to continue. For example, control and process engineers can initially design and install a control system suiting their immediate needs. Current solutions however do not facilitate a smooth and uncomplicated transition for the respective changes. Multiple technologies underneath many vendors' products complicate configuration and management of systems. This is also aggravated when third party systems are involved. Such complexity hinders the system's capacity to provide higher-level information and can reduce the ability to configure such systems.

SUMMARY

The following presents a simplified summary in order to provide a basic understanding of some aspects of the subject disclosure. This summary is not an extensive overview and it is not intended to identify key or critical elements of all aspects nor delineate the scope of any or all aspects. The sole purpose of this summary is to present some concepts of one or more aspects in a simplified form as a prelude to the more detailed description that is presented later.

An aspect relates to a device comprising an interface component that obtains a set of alternative interface applications for an industrial automation system. The device also comprises a deployment component that enables a first interface application from the set of alternative interface applications. The interface component can maintain support for each interface application included in the set of alternative interface applications, wherein each interface application is a different interface version.

Another aspect relates to a method comprising receiving a first interface application and deploying the first interface application. Method also comprises obtaining a second interface application and mapping the second interface application to the first interface application. Further, method comprises enabling the second interface application and selectively resuming operation with the first interface application.

Another aspect relates to a system comprising an interface component that retains information related to a first interface application and a second interface application. System also comprises a mapping component that associates the first interface application with the second interface application and a validation component that accesses data related to a third interface application. Also included in system is a download component that selectively obtains the third interface application. The mapping component associates the third interface application with the second interface application. System also comprises a deployment component that enables the third interface application and maintains support for the first interface application and the second interface application.

To the accomplishment of the foregoing and related ends, one or more aspects comprise features hereinafter fully described. The following description and annexed drawings set forth in detail certain illustrative features of one or more aspects. These features are indicative, however, of but a few of various ways in which principles of various aspects may be employed. Other advantages and novel features will become apparent from the following detailed description when considered in conjunction with the drawings and the disclosed aspects are intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component," "module," "object", "service," "system," "interface," or the like are generally intended to refer to a computer-related entity, either hardware, a combination of hardware and software, software, or software in execution. For example, a component can be, but is not limited to being, a process running on a processor, a processor, a hard disk drive, multiple storage drive (of optical and/or magnetic storage medium), an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Figure 1:
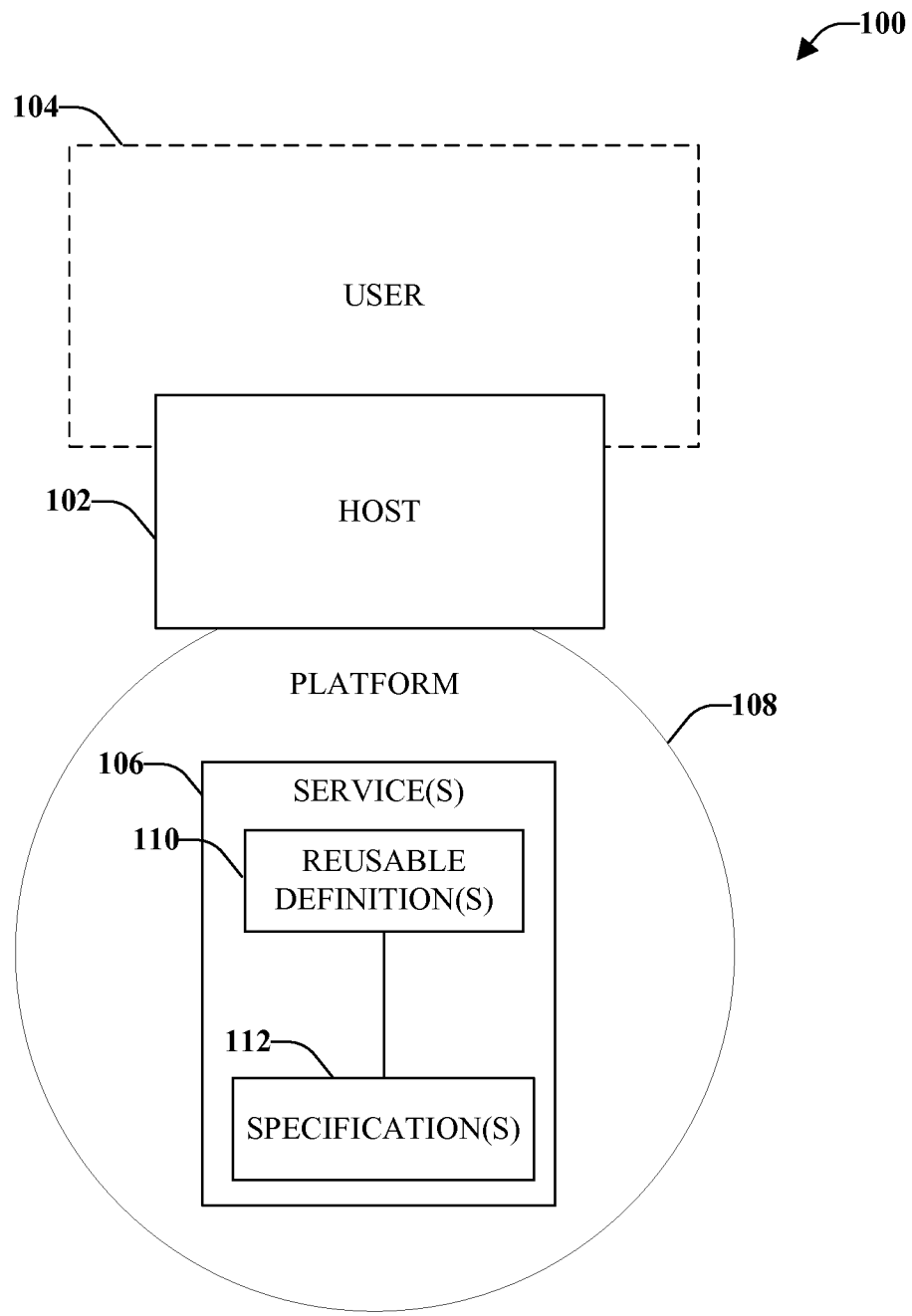
FIG. 1 is a block diagram illustrating interaction of a service and a host in an industrial automation system.

Referring initially to FIG. 1, illustrated is an example industrial automation system 100, according to an aspect. The industrial automation system 100 is configured to utilize modular automation to construct applications with reusable software that exposes functionality of components of the industrial automation system 100, while providing an abstraction from details of communication and interaction with such components.

The industrial automation system 100 includes a host 102 that is configured to interface with a user and/or entities (e.g., the Internet, another system, a computer, and so forth), hereinafter referred to as user 104. The interface between host 102 and user 104 can be through various interface mechanisms, including a human machine interface (HMI) or a graphical user interface (GUI). Although only a single host 102 is illustrated, industrial automation system 100 can include two or more hosts, according to an aspect. According to some aspects, the host 102 can be one or more industrial controllers (e.g., programmable automation controller (PAC), programmable logic controller (PLC), and so forth). The one or more industrial controllers can be associated with one or more human machine interfaces (HMIs). The term "industrial controller" as utilized herein can include functionality that can be shared across multiple components or networks.

The host 102 need not be limited to an industrial controller. According to some aspects, the host 102 can be (or can be associated with) one or more computer or network components within the industrial automation system 100. For example, the host 102 can be a computer, a server, a client, an industrial module, a human machine interface (HMI), a graphical user interface (GUI), and so forth.

The host 102 can be configured to execute at least one service 106 based, at least in part, on input from the user 104. The service 106 is illustrated as contained within a platform 108, which can provide an interface between the host 102 and the service 106. For example, the service 106 can be an executable function for the industrial automation system 100 executed on a platform 108 of the host 102. By providing the interface between the host 102 and the service 106, the platform 108 provides a set of abstractions that enable the service 106 to be implemented (e.g., compiled and executed) in disparate hosts without modification to the service. The platform 108 can be any type of hardware, software, or combination of hardware and software that allows the service 106 to run and/or execute, for example, in some embodiments, the platform 108 can be the Java™ programming language and computing platform. For example, the platform 108 can include one or more of a computer's architecture, an operating system, one or more programming languages, or user interfaces.

The service 106 can be employed as one or more executable functions for the industrial automation system 100. In accordance with some aspects, the service 106 is a reusable template that can be utilized in the development of software for the industrial automation system 100. The software can include, for example, control programs for physical manufacturing unit operations, such as assembly applications. The physical manufacturing unit can include, for example, conveyors, mixers, packaging units, process skids, robotic cells, tanks, valve matrices, and so forth. Additionally or alternatively, the software can include higher-level programs, such as batch processing applications, supervisory applications, monitoring applications, or control programs that control aspects of the industrial automation system 100.

According to some aspects, the service 106 can include one or more module objects, encapsulated objects, control objects, and so on. The service 106 can be configured to facilitate software development by hiding internal interfaces, messages, programming code, and so forth from the user 104 while providing standard and/or generic external interface(s). In accordance with some aspects, the service 106 can simplify programming in the industrial automation system 100 by allowing the user 104 (e.g., a process and control engineer) to work with published functionality of the service 106, which can be independent of how the functionality was achieved, which can mitigate integration and maintenance requirements and reduce costs. This can increase quality, consistency, and reusability of the software by providing a standardized programming structure between various components or hosts 102 (e.g., from different manufacturers) within the industrial automation system 100.

For example, utilizing services 106 can benefit both software developers and end users. For example, utilization of services can allow a developer of control applications to concentrate on the functionality of an application rather than the mechanics of implementation, such as by separating procedure control and equipment control. Services 106 can facilitate continuous software improvements; at the same time, services 106 can mitigate the risks that changes to the software may present to the industrial automation system 100. Utilization of services, as disclosed herein can simplify testing of software, and can provide a reduced chance that new software adversely affects other components or hosts 102 within the industrial automation system 100. This can also reduce development time, accelerate design cycles, and reduce cost. Services 106 can also allow end users (e.g., manufacturers) to separate procedural control from equipment control, which can allow end users to adopt existing assets to new product requirements with minimal time and capital investment.

According to various aspects, the service 106 can separate procedural control from equipment control by employing a hierarchically structured data model (e.g., a hierarchically structured data model according to the International Society for Automation (ISA)-88 standards). In such a manner, procedural control can be logically separated from equipment control. Logical separation can enable the separation of product-specific definitions, instructions, and information from processing equipment entities.

The service 106 can be configured to hide internal aspects from a user 104. For example, the service 106 (and/or platform 108) can include or can be associated with one or more interfaces. In accordance with some aspects, the one or more interfaces can be located within the host 102. The one or more interfaces can hide internal functions of the service 106, including the underlying code and complexity. According to an embodiment, the one or more interfaces can define external behaviors supplied to at least one client application engaging the service 106. Through the one or more interfaces, the service 106 can expose data, expose operations that can be performed, expose dependencies on other services, and so forth. The one or more interfaces can allow the service 106 to connect to at least one other service to engage with a client application, according to an aspect. For example, an industrial process can be defined with a plurality of services, wherein a first service is a control service that controls a second service (e.g., equipment service) and a third service (e.g., material service), wherein the third service is subordinate to the second service. It is to be appreciated that the service 106 can support more than one interface, for example, to engage with more than one client application or to logically partition the functionality of the service. In some aspects, a single interface can support a plurality of clients. Separation of a service into multiple interfaces can allow one interface to be extended and/or changed without impacting other interface areas. Such separation can mitigate the overall impact to areas of an industrial automation system that utilize the unchanged interface, but not the changed interface.

The interface can hide internal functions of the service 106. These internal functions can include one or more reusable definitions 110 and one or more specifications 112. In accordance with some aspects, the service 106 can be an association of one or more reusable definitions 110 with one or more specifications 112. The one or more reusable definitions 110 can include program code that can alter the state of one or more resources in an industrial automation system (e.g., logic code that can control opening and closing of a valve). The one or more reusable definitions 110 can include programming code, for example, ladder logic, function chart, script, Java™ C code, and so on. The one or more specifications 112 can include the one or more resources. The one or more resources can include one or more of equipment, material, personnel, segments, storage, and so forth. For example, the resource may be a valve that is opened or closed according to logic code.

In accordance with some aspects, the programming code of the reusable definition 110 can be in a different physical location from the resource of the specification 112 within an enterprise resource control (ERC) system. It is to be appreciated that the service 106 can support more than one reusable definition 110. According to some aspects, different reusable definitions 110 can be targeted for different hosts such that a service 106 with more than one reusable definition 110 can be deployed to more than one host 102 where each host may have different computing capabilities and methods.

The service 106 can include external references (not illustrated) that can maintain metadata pertaining to the service 106, according to an aspect. For example, the external references can include information that describes dependencies of the service 106, required dependencies to support the reusable definitions 110 (e.g., operational requirements). The external references can also include, for example, specific qualities (e.g., performance, reliability, physical characteristics, and so forth) of the service 106 and/or security aspects (e.g., security rules and automatic application thereof, or authentication procedures) of the service 106. The service 106 may also include other portions (not shown), such as local data, visualization elements, etc. Alternatively, a service 106 may be more limited in nature (e.g., only including a single specification 112).

Figure 2:
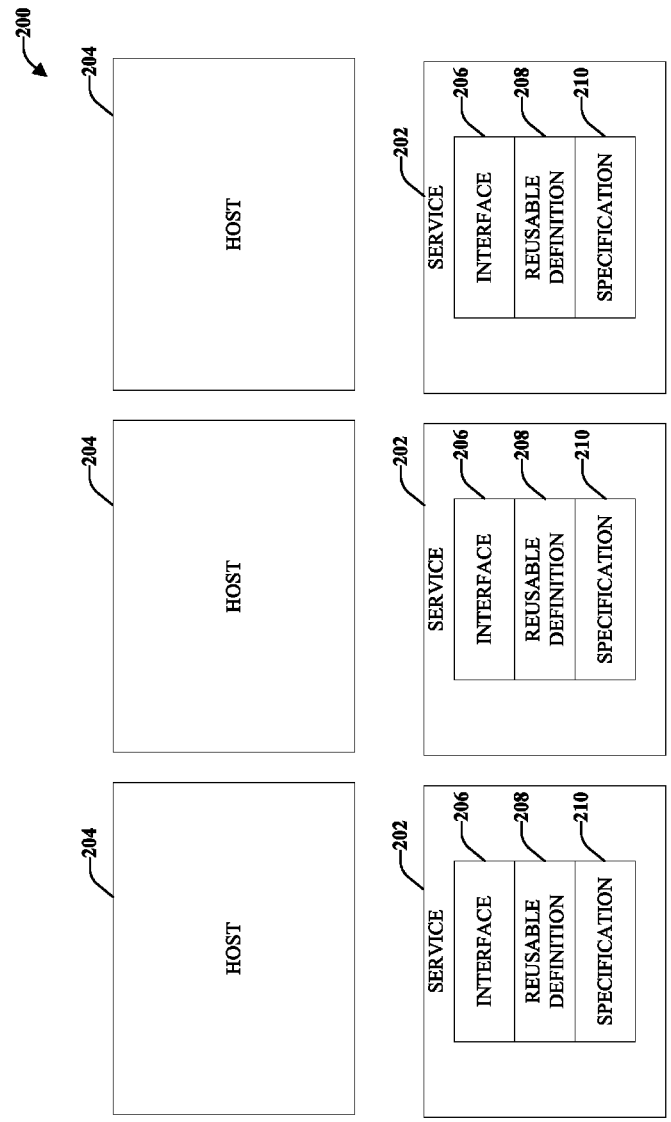
FIG. 2 is a block diagram illustrating a system that utilizes services and hosts.

FIG. 2 illustrates an example system 200, according to an aspect. System 200 can be a portion of an industrial control configuration of an industrial automation system. Included in system 200 are services 202 (e.g., modular objects, encapsulated objects, control objects, etc.) that can exist in conjunction with a one or more hosts 204 upon an industrial control configuration. For example, the services 202 can exist in conjunction with the hosts 204 through an interface 206. Functionality related to the services 202 can be similar to plug-in approaches in software. For example, services 202 can be connected to control a process in the industrial control environment. Services 202 can be customizable and reusable, for example, among multiple users, multiple locations, multiple platforms, and/or multiple hosts 204.

The services 202 can grow into different layers of an organizational hierarchy to form a service oriented control system. For example, an industrial process can be defined with a plurality of services 202, wherein one service is a control service, which controls an equipment service and a material service, wherein the material service is subordinate to the equipment service.

Generally, the service 202 is an association of one or more reusable definitions 208 with one or more specifications 210. Reusable definitions 208 can include program code that can alter a state of one or more resources in the industrial control environment. For example, the reusable definitions 208 can be at least one of logic code, including ladder logic, function chart, script, Java™, C code, and the like. It is to be appreciated that a service 202 can support multiple reusable definitions 208 (e.g., to engage with multiple hosts 204). The one or more specifications 210 can include the one or more resources. The one or more resources can include one or more of equipment, material, personnel, segments, storage, and the like. For example, the resource may be a valve that is opened or closed according to logic code.

Similar to a plug-in approach in software, a service 202 can hide internal aspects (e.g., reusable definitions 208 and specifications 210) from a user. The service 202 can hide these aspects by providing standard and/or generic interfaces 206 to external systems. According to an embodiment, the interface 206 can allow the service 202 to expose external reference information about the service 202. For example, the external reference information can include information describing dependencies of the service 202, required connections to support the reusable definition 208, and the like. The service 202 can support multiple interfaces 206, which can allow the service 202 to engage with multiple hosts 204.

According to an embodiment, users and/or hosts 204 can access the services 202 across a network (not shown). The network may include, for example, any public or private network. For example, services 202 can be created in an offline manner, such as in a computer database (not shown). When created offline, the services 202 can be downloaded for execution on the hosts 204.

Figure 3:
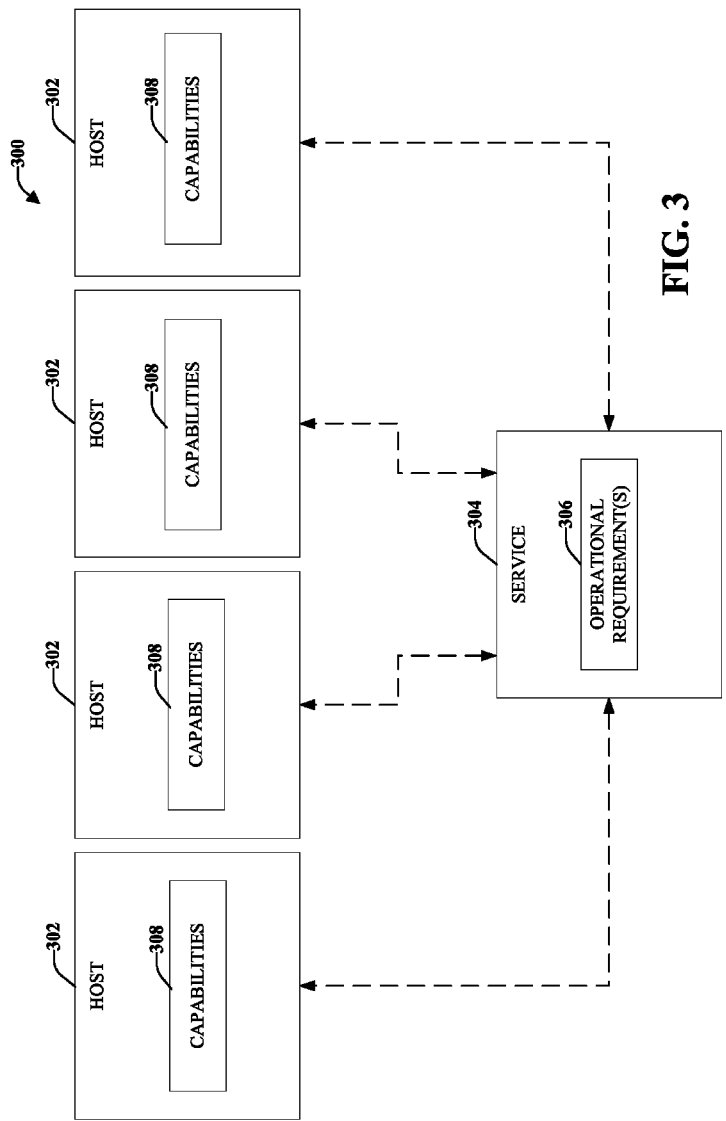
FIG. 3 is a block diagram illustrating a system for matching services and hosts.

FIG. 3 illustrates an example system 300 for expressing matching among hosts 302 and a service 304. The service 304 can have one or more operational requirements 306. For example, the operational requirements 306 can be that a host should have a high resolution size and a large memory. Hosts 302 can have different capabilities 308 that can be exploited by the service 304. A binding (represented with a dotted line) can be created with a host in an attempt to match one or more operational requirement 306 with one or more capabilities 308. If more than one host 302 includes one or more capabilities 308 that match one or more operational requirements 306 of a service 304, then multiple bindings can be created and/or selection of a single host can occur and one binding can be used. If no host 302 has a capability 308 matching an operational requirement 306 of the service 304, then an error message can be generated. In accordance with some aspects, if there are no current hosts 302 that match an operational requirement 306, periodic or continuous observation of the environment can occur to detect when a new host 302 that has the required capability 308 enters the environment. The periodic or continuous monitoring can also occur to detect modifications to an existing host 302 to determine when the host 302 has been modified and now meets at least one operational requirement 306 of the service 304.

Figure 4:
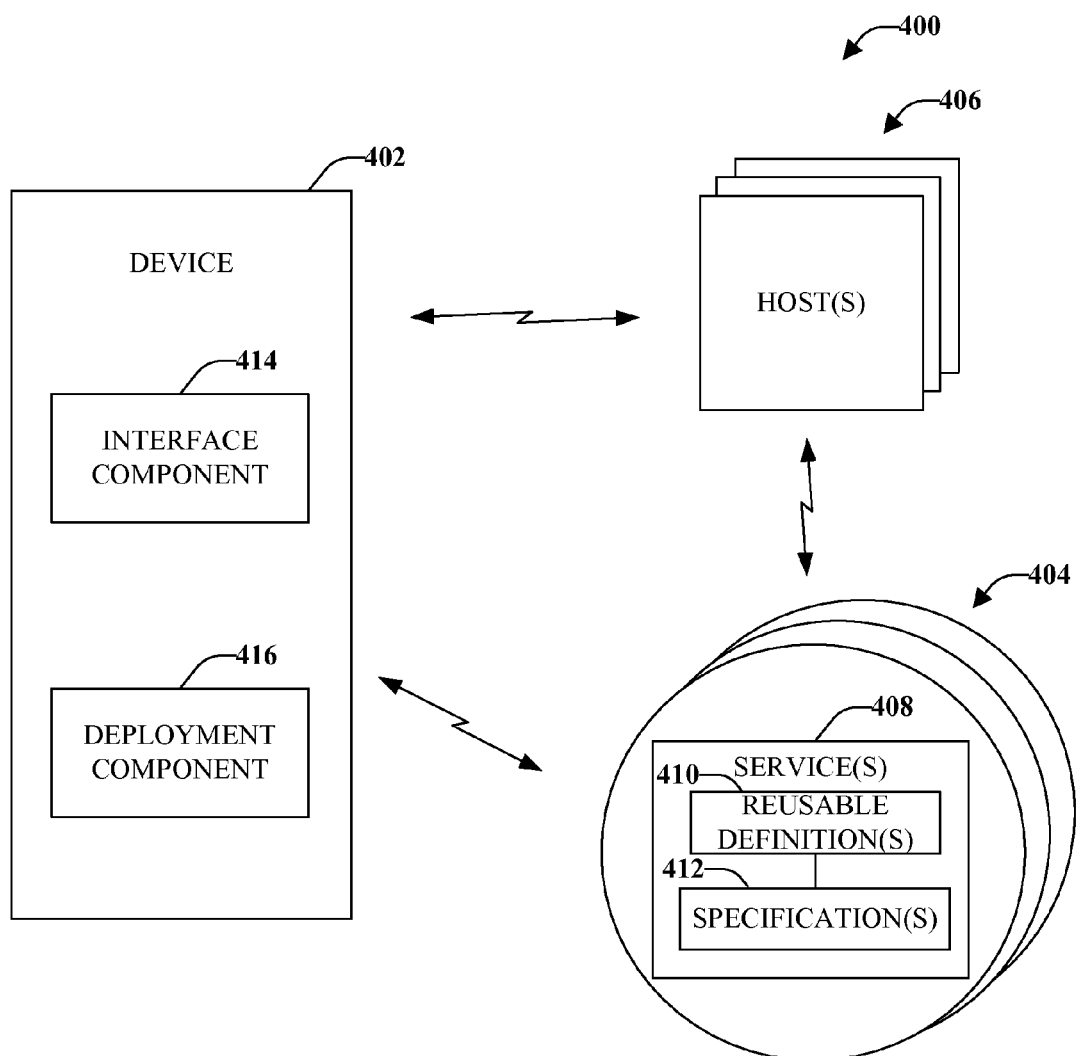
FIG. 4 illustrates an example industrial control system that supports multiple platform configurations, according to an aspect.

FIG. 4 illustrates an example industrial control system 400 that supports multiple platform configurations, according to an aspect. Support of multiple interfaces associated with multiple services and related platform configurations enables grouping and namespace separation. Multiple platform configurations can also support visibility controls, which can allow different users access to different sets of controls and objects. Platform configurations can be tagged to provide different functionality depending on the intended use of the platform configurations. Multiple platform configurations also enable scalable updating. Traditionally, the entire industrial control system is updated in response to changes in implementation of one or more of software, hardware, or firmware, necessary to operate the industrial system. However, with the one or more disclosed aspects, service(s) and associated platform configuration(s) are decoupled, which allows individual platform configurations to be revisioned (e.g., updated) separately. The decoupled platform configuration(s) allow each platform configuration to be reused with different implementations (e.g., implementation of software or firmware) and objects. Additionally or alternatively, the platform configuration(s) can reuse specific methods in which reusable definitions contain only the definitions of operation. This is a more granular approach than the approach traditionally performed (e.g., where whole services are reused).

Included in industrial control system 400 is a device 402 that interacts with multiple platform configurations 404. Each of the different platform configurations 404 can be utilized with different host(s) 406 within the industrial control system 400 (or within a related architecture). In accordance with some aspects, a single host 406 is utilized with multiple platform configurations 404. Although various aspects herein illustrate connections between device 402, platform configurations 404, and host(s) 406 as wireless links, according to some aspects, the links can be wireline links, or both wireless and wireline links, or might be on the same physical machine and use memory or other techniques suitable for communication.

The multiple platform configurations 404 can include one or more services 408 associated with one or more reusable definitions 410 and/or one or more specifications 412. In accordance with some aspects, different platform configurations 404 can use a common service 408, a common reusable definition 410, a common specification 412, or combinations thereof. Each component (e.g., service, reusable definition, specification) of the platform can be located anywhere within an industrial control system 400 and does not need to be co-located with other components of the platform and/or the host(s) 406.

Device 402 comprises an interface component 414 that is configured to provide a set of functional connections and controls for various automated host implementations, wherein the automated host implementations are configured to interact with a plurality of platform configurations. In accordance with some aspects, the automated implementation of the host is execution of a service that comprises a reusable definition and a specification. Interface component 414 can provide a mechanism for interaction between a user and/or entity (e.g., the Internet, another system, a computer, and so on, hereinafter referred to as user), the one or more hosts 406, and the multiple platform configurations 404. For instance, the interface component 414 can be, but is not limited to being, a keyboard, a mouse, a pressure-sensitive screen, a graphical user interface, a microphone, and voice recognition software. In accordance with some aspects, the one or more hosts 406 and the device 402 can be in separate locations within the industrial control system 400 or another location (e.g., satellite plant, vendor location, client location, and so forth).

In accordance with some aspects, device 402 is configured to be utilized for one host 406, wherein the device 402 is independent of the implementation and is transparent to the end user. In such a manner, device 402 can be reused on multiple hosts that are functional equivalents but that may have fundamental underlying differences. Thus, logic can be implemented in different languages, different software bases, and so forth.

Also included in device 402 is a deployment component 416 that is configured to support a plurality of platform configurations 404. Further, the deployment component 416 can be functionally independent of the platform configurations 404. For example, deployment component 416 can be configured to be reused on multiple platform configurations that are functional equivalents, but have underlying differences. For example, at least one multiple platform configuration can have a different programming language than at least one other of the multiple platform configurations. However, even though the platform configurations have different programming languages, the deployment component 416 is configured to support both languages and, therefore, both platform configurations. In accordance with some aspects, deployment component 416 does not support each individual language but instead utilizes a high-level programming code that can interface with multiple programming languages without being programming language specific.

Additionally or alternatively, deployment component 416 can be configured to support platform configurations having different implementations. For example, one implementation can be in an industrial automated controller and a second implementation can be in a software system. The support of different implementations can allow an end application to be indifferent or unbound to a current implementation on another end application.

According to some aspects, deployment component 416 can be configured to capture a command or action regardless of how the command or action is used. For example, an action might be that if a certain condition occurs, an alarm (e.g., a specification) is activated. A similar specification (e.g., alarm) can be employed when a different event occurs. Even though a similar specification (e.g., alarm) is used in both cases, the deployment component 416 allows the reusable definition to interact with the specification (e.g., alarm) even though the specification is being utilized differently by two different automated host implementations.

In accordance with some aspects, deployment component 416 can aggregate one or more services 408, one or more reusable definitions 410, and/or one or more specifications 412. The aggregation can include identifying two or more services, two or more reusable definitions, and/or two or more specifications that are similar and determining that the similar services, reusable definitions, and/or specifications can be aggregated or utilized interchangeably. In accordance with some aspects, deployment component 416 aggregates based at least in part on a language requirement of an implementation of the at least one service. According to some aspects, deployment component 416 aggregates based at least in part on metadata related to an implementation of the at least one service. In some aspects, deployment component 416 aggregates based at least in part on an analysis of the at least one of a plurality of capabilities. In additional or alternative aspects, deployment component 416 aggregates in response to definition of user-specific configuration of industrial control system 400.

Aggregation of a group of services results in a composite service, or composite object. The composite service includes at least one interface from each of the services in the group of services. As indicated supra, deployment component 416 can aggregate the group of services. In addition, in certain embodiments, deployment component 416 can manage the at least one interface of each of the services in the group of services. The management can be effected in accordance with two approaches: (1) Compact. The set of interfaces spanned by the at least one interface of each of the services in the group of services can form the composite service with a single, compact interface associated with the composite service. In this approach, at least a sub-set of one or more interface(s) in the set of interfaces are hidden and not available to users (machine or human agent) disjointedly from, or outside, the composite service. (2) Loose. Each interface in the set of interfaces spanned by the at least one interface of each of the services in the group of services is transferred intact into the composite service. Such set of interfaces embody the interface of the composite service; the composite service retains the interface(s) in the set of interfaces as individual entities. Each interface can be exposed as part of formation of the composite service, but remains hidden otherwise.

Figure 5:
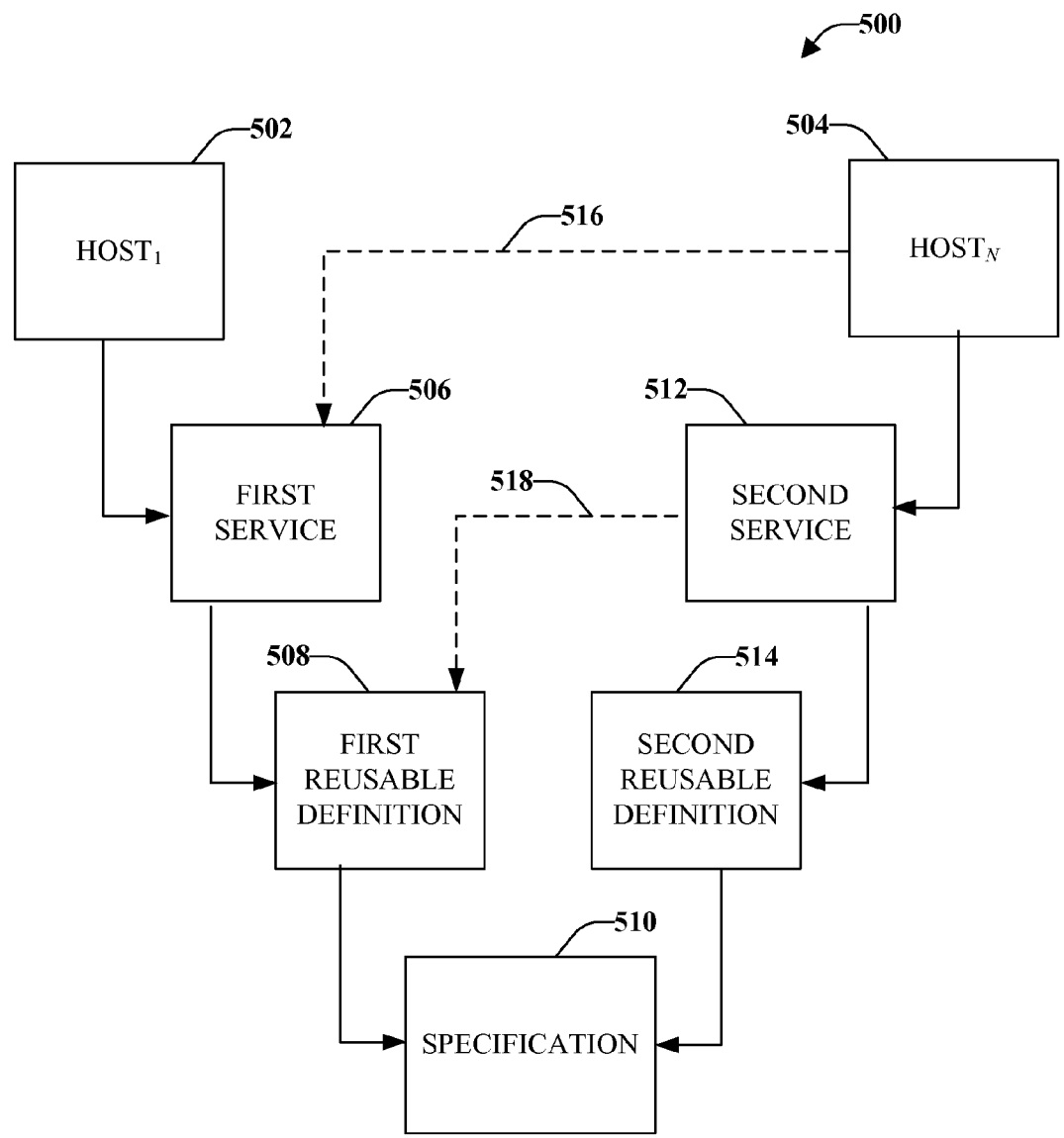
FIG. 5 illustrates a schematic representation of an example group of alternative platform configurations, according to an aspect.

In order to visualize a group of alternative platform configuration possibilities and/or aggregation of at least a portion of platform configurations, FIG. 5 illustrates a schematic representation 500 of an example group of alternative platform configurations, according to an aspect. Illustrated in the schematic representation 500 are multiple hosts, labeled $Host_1$ 502 and $Host_N$ 504, where N is an integer equal to or greater than one. $Host_1$ 502 can utilize a first service 506, which utilizes a first reusable definition 508, which utilizes a specification 510 (e.g., creating a platform configuration that comprises service 506, reusable definition 508, and specification 510). In a similar manner, $Host_N$ 504 can utilize a second service 512, which utilizes a second reusable definition 514, which utilizes the specification 510. However, in accordance with some aspects, another possibility for a platform configuration is that $Host_N$ 504 can utilize first service 506 as indicated at 516. In a similar manner, $Host_1$ 502 can alternatively utilize second service 512. Further second service 512 might alternatively utilize first reusable definition 508, as indicated at 518. In a similar manner, first service 506 might alternatively utilize second reusable definition 514. In accordance with some aspects, a host might utilize more than on service, more than one reusable definition, one or more specifications, or combinations thereof.

Figure 6:
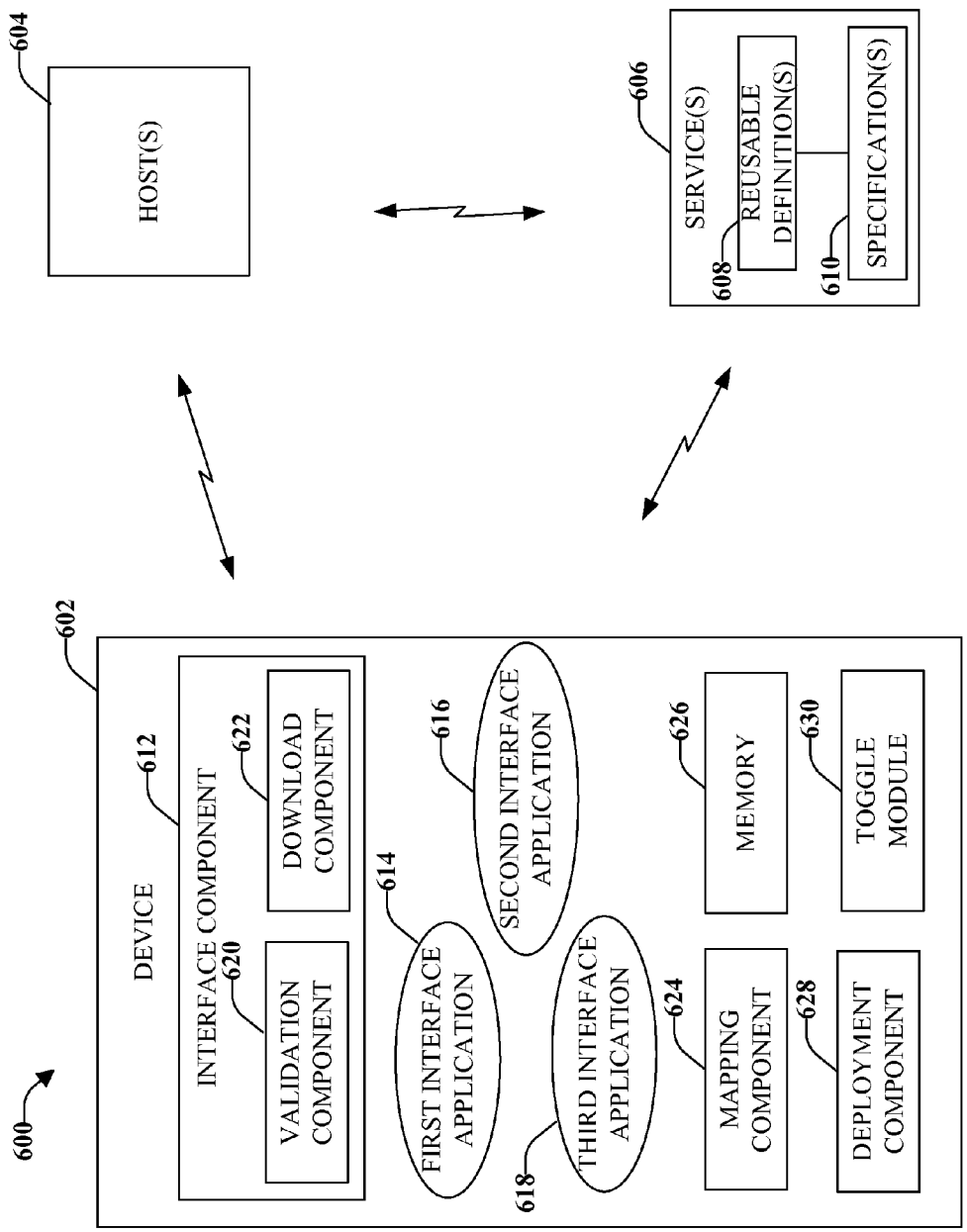
FIG. 6 illustrates an industrial control system that is configured to support multiple interfaces and/or multiple interface versions at run-time, according to an aspect.

FIG. 6 illustrates an industrial automation system 600 that is configured to support multiple interfaces and/or multiple interface versions at run-time, according to an aspect. Support of multiple interfaces and/or multiple interface versions during runtime can enable the support without the need to shut down a machine or a device, which can save time as well as associated costs (e.g., loss of production, loss of manpower, and so forth). For example, live updates can be applied to one of the interfaces (e.g., an updated version or new revision of the interface) and can be tested during runtime. If the test does not operate as expected or if other problems occur, system 600 can automatically revert to an older format interface for which support has been retained.

Included in system 600 is a device 602 that is configured to operate in an industrial automation system or another system. Device 602 can be associated with one or more hosts 604 and at least one service 606. The at least one service 606 can comprise at least one reusable definition 608 and at least one specification 610. In accordance with some aspects, service 606 can be internal to device 602, however, service 606 can be external to device 602, as illustrated. Although the connections between the device 602, the host(s) 604, and the service(s) 606 are illustrated as wireless links, according to some aspects, the links can be wireline links, or both wireless and wireline links, or might be on the same physical machine and use memory or other techniques suitable for communication.

Device 602 comprises an interface component 612 that is configured to obtain a set of alternative interface applications for industrial automation system 600. The set of alternative interface applications is illustrated as a first interface application 614, a second interface application 616, and a third (or subsequent) interface application 618, however, the disclosed aspects are not limited to three interface applications and fewer or more interface applications can be supported by device 602 in accordance with the disclosed aspects. Each interface application 614, 616, 618 in the set of alternative interface application can be a different interface version associated with the at least one service(s) 606, the reusable definition(s) 608, and/or the specification(s) 610.

Figure 7:
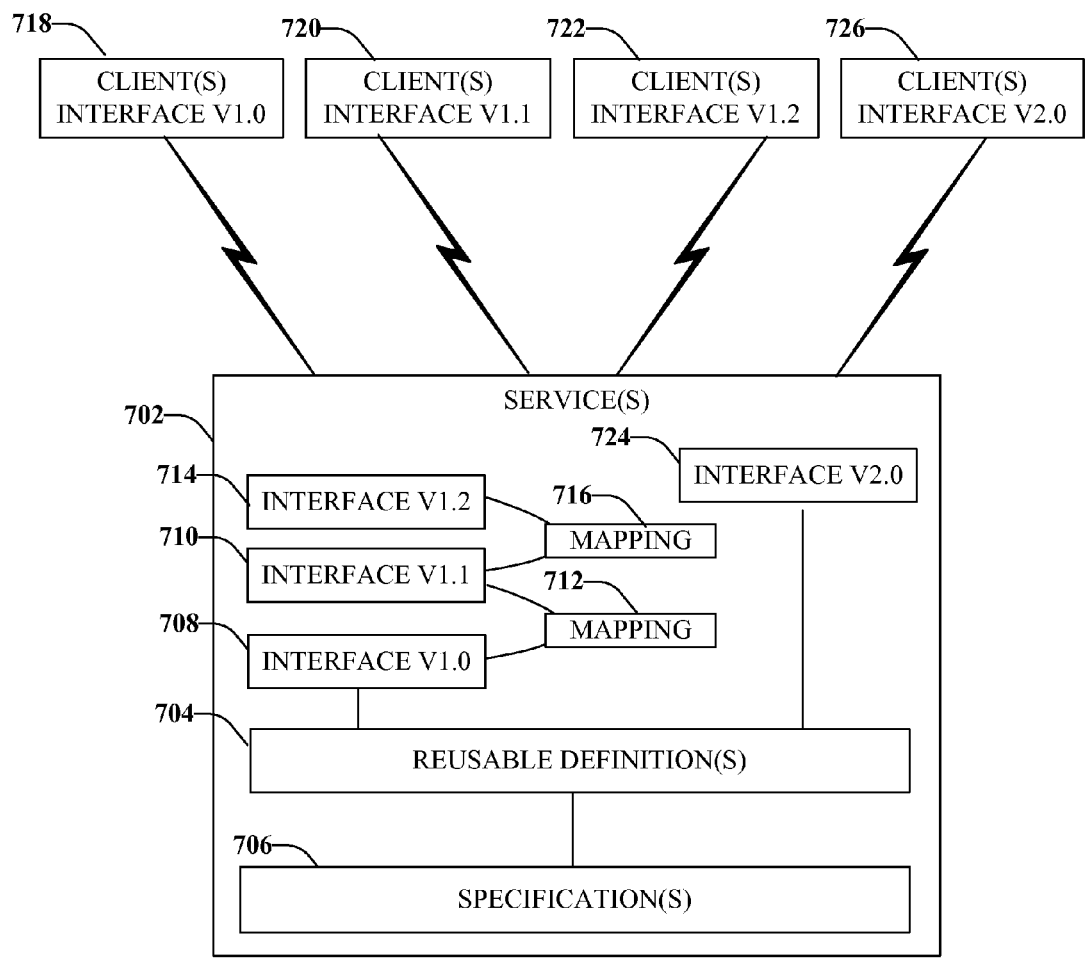
FIG. 7 illustrates a schematic representation of a system that is configured to provide multiple interface support, according to an aspect.

Examples of different interface versions that can be applied, according to an aspect, is shown in FIG. 7, which illustrates an example schematic representation 700 of a system that is configured to provide multiple interface support, according to an aspect. System 700 includes at least one service 702 that comprises one or more reusable definitions 704 and one or more specifications 706. Service 702 is configured to implement and support multiple interface applications. For example, a first version of an interface application 708 (interface V1.0) is obtained and deployed with service 702.

The first version of the interface application 708 can be edited (on-line or off-line) to produce a second version of the interface application 710 (interface V1.1). A mapping 712 can be provided between the second version of the interface application 710 and the first version of the interface application 708. The mapping 712 provides a mechanism to translate (e.g., transform, cross-reference) information between revisions of the interface (e.g., between first version of interface application 708 and second version of interface application 710). Subsequent revisions of interface applications 714 (e.g., interface V1.2) can be produced or obtained (e.g., downloaded) and associated with service 702. A mapping 716 (similar to the mapping between first interface application 708 and second interface application 710) is retained between second interface application 710 and third interface application 714.

The mappings 712, 716 allow the service 702 (or a device) to continue to support clients associated with each of the different revisions, illustrated as first client(s) interface 718 (V1.0), second client(s) interface 720 (V1.1), third client(s) interface 722 (V1.2). The client(s) interfaces interact with one or more of the revisions of the interface applications.

At major interface revisions, shown as (fourth) interface application 724 (e.g., interface V2.0 and associated client(s) interface V2.0 726), such transformations/adaptations may not be possible. The major interface revision can necessitate "breaking change" where mapping layers 712, 716 are not provided between a previous interface version and the major interface revision. Thus, there is no cross-reference between the major interface revision and the previous revisions, according to an aspect. In this scenario, the existing interface versions (e.g., first interface application, second interface application, third interface application, and so on) continues to service the clients, regardless of the interface revisions those clients require (e.g., there is still support for the application interfaces for which client support is needed).

Referring again to FIG. 6, to obtain the set of alternative interface applications, interface component 612 can include a validation component 620 that is configured to perform a compatibility check of each interface application when the interface application becomes available. For example, a notification can be received by interface component 612 (or another component of device 602) that provides notice of a new interface application or a revision to a previous interface application. The notice can be received from service(s) 610, from host(s) 604, or from another entity within system 600.

Validation component 620 can compare the new interface application (e.g., second interface application 616) to an existing application (e.g., first interface application 614) to determine compatibility between the interface applications. If validation component 620 determines there is compatibility, approval of the interface application (e.g., second interface application 616) is provided to a download component 622 that obtains the interface application.

In accordance with some aspects, validation component 620 can receive a request to test an interface selected from a set of alternative interfaces. The request can be received from a user and/or can be automatically inferred based on a defined outcome (e.g., a desired end result). In accordance with some aspects, the request is received from an Original Equipment Manufacturer (OEM) that is authorized to interact with system 600. For example, the OEM might be performing an update to its machinery and would like to perform testing within system 600.

Download component 622 is configured to obtain information related to first interface application 614, second interface application 616, third interface application 618, and/or other interface applications. Download component 622 can also receive information related to the one or more hosts 604. In accordance with some aspects, download component 622 receives the interface applications in the form of updates. The updates can be received though a web-based subscription, according to an aspect, wherein download component 622 selectively downloads the updates (e.g., interface applications). For example, if the update is approved by validation component 620 the update is download. In another example, if validation component 620 does not approve the update, the update is not download and an error message or other indication that the update will not be applied by device 602 can be conveyed to the user though host 604 or through another means perceivable by the user.

Also included in device can be a mapping component 624 that is configured to translate information between each interface application. For example, the mapping component 624 can maintain information related to a revision level of each interface application. In accordance with some aspects, mapping component 624 is associated with a memory 626 that maintain information related to the interface applications, wherein the information include the mapping or cross-reference between the interface applications.

Device 602 also comprises a deployment component 628 that is configured to utilize an interface application (e.g., second interface application 616, third interface application 618) while support for an existing interface application (e.g., first interface application 614, second interface application 616) is maintained. This can allow support for two or more interface applications without having to deploy an entirely new interface application (or service) that might not be suitable or compatible with the other interface application or services. Deployment component 628 can provide runtime testing of the second interface application 616 (or subsequent interface application), which can allow for validation of the second (or subsequent) interface application 616 before that interface application is utilized with the device 602. Since the architecture is modular, the interface applications can be compared and contrasted before the updated interface application (e.g., second interface application 616, third interface application 618) is downloaded and/or implemented within system 600. If the interface application being tested is not suitable, a toggle module 630 is configured to dynamically switch from the interface application being tested (e.g., second interface application 616, third interface application 618) to the previous version interface application (e.g., first interface application 614, second interface application 616).

In accordance with some aspects, second interface application 616 is compared with a plurality of alternative interface applications in order to determine whether second interface application 616 is suitable or whether one of the alternative interfaces should be utilized instead (e.g., first interface application 614, third interface application 618, or another interface application). In this aspect, deployment component 628 is configured to select one of the multiple versions of interface applications to utilize depending on a desired result, wherein a particular interface application has been identified as suitable for the desired result.

In accordance with some aspects, interface component 612 provides multiple views through the device 602 or host(s) 604. The views can be either logic views or host views using the same tool, depending on an access level of the user (e.g., based on a validation, access code information, and so forth). The modules can be HMI screens that execute on display hardware or can be executed in a logic controller, or on an application server.

In another aspect, interface component 612 provides metadata with information relating to accessibility that can be associated with the interface. The metadata can include information related to whether the interface is read only, write only, read-write, and so forth. The metadata can be discoverable by other components, according to an aspect.

In view of exemplary systems shown and described above, methods that may be implemented in accordance with the disclosed subject matter, will be better appreciated with reference to various flow charts. While, for purposes of simplicity of explanation, methods are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement methods described herein. It is to be appreciated that functionality associated with blocks may be implemented by software, hardware, a combination thereof or any other suitable means (e.g. device, system, process, component). Additionally, it should be further appreciated that methods disclosed throughout this specification are capable of being stored on an article of manufacture to facilitate transporting and transferring such methods to various devices. Those skilled in the art will understand and appreciate that a method could alternatively be represented as a series of interrelated states or events, such as in a state diagram.

Figure 8:
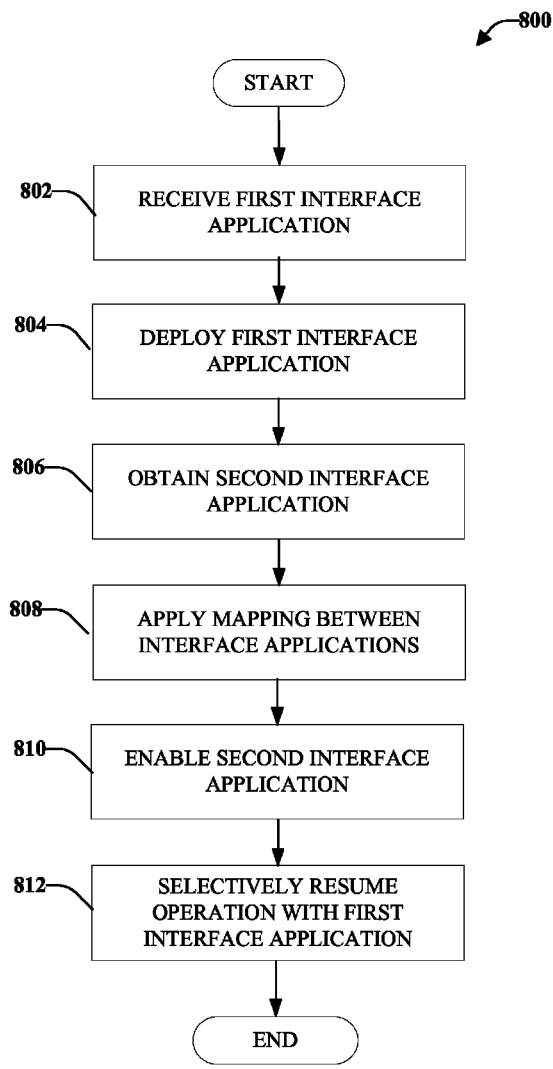
FIG. 8 illustrates a method for dynamically switching between multiple interface applications, according to an aspect.

FIG. 8 illustrates a method 800 for dynamically switching between multiple interface applications, according to an aspect. Dynamic switching can be utilized to maintain multiple versions of an interface. This can allow runtime testing of different interface applications as well as other benefits (e.g., automatic switching between interface applications to provide different results such as a change in material being run in an industrial control environment in order to meet client change requests or different client products). In accordance with some aspects, dynamic switching can facilitate forwarding and/or routing across interface application versions or revision levels. Dynamic switching can also provide backward and forward compatibility checks and/or validations between interface applications. Further, dynamic switching can provide on-line editing of an interface application.

Method 800 starts, at 802, when a first interface application for an industrial automation system is received. The first interface application is deployed, at 804. A second interface application is obtained, at 806. The second interface application can be obtained by downloading an update that comprises the second interface application. In accordance with some aspects, the second interface application can be received based on a user request for a desired outcome, wherein a change to the first interface application was performed (resulting in the second (or subsequent) interface application) in order to comply with the user request. In accordance with some aspects, the second (or subsequent) interface application is obtained based on an update that is to occur within the industrial control system (e.g., a new revision level). According to some aspects, the second (and subsequent) interface application is obtained in the form of an update that is downloaded. The update(s) can be delivered via a web-based subscription, according to an aspect.

At 808, a mapping between the first interface application and the second (or subsequent) interface application is developed and retained. The information can include information related to a revision level of the interface application, specific information related to a difference between the first and second (or subsequent) interface applications, and/or other information that can help validate interface applications. In accordance with some aspects, the information and/or mapping is retained in a computer-readable storage medium. Retaining the information can include storing information related to a first revision level of the first interface application and a second revision level of the second interface application.

The second interface application is enabled, at 810. The enabling can include testing the second interface application during runtime. In accordance with some aspects, the second (or subsequent) interface application is enabled while support for a previous (e.g., first) interface application is retained. In accordance with some aspects, the enabling comprises retaining support for the first interface application. According to some aspects, the enabling comprises performing a test of the second interface application during runtime.

If the enabled (e.g., second) interface application does not perform as expected or is to be disabled for another reason (e.g., testing is concluded), at 812, operation with an existing (e.g., first) interface application is resumed. The existing interface application can be one or more interface applications from a set of alternative interface applications that were in operation before the test began. The resumption of the existing interface application allows for dynamic switching between new interface application and old interface applications (e.g., to facilitate updating from an old interface application to a new interface application).

In accordance with some aspects, the dynamic switching can be performed during runtime, which can allow the use of multiple interface application without shutting down a device or machine, for example. Live updates can be applied to one of the interface applications, which can be tested during runtime. If the test does not operate as expected, the interface application can be automatically reverted to the old format or revision level. In accordance with some aspects, a interface application can be extended while support for the existing interface application is maintained, which can mitigate the need to deploy an entirely new service. Since the architecture is modular, the interface application can be compared and contrasted before the updated interface application needs to be downloaded.

Other features include multiple views through the device. The views can be either logic views or machine views using the same tool, depending on an access level of the user (e.g., based on a validation, access code information, and so forth). The modules can be HMI screens that execute on display hardware or can be executed in a logic controller, or on an application server.

Another aspect provides metadata with information relating to accessibility that can be associated with the interface application. The metadata can include information related to whether the interface application is read only, write only, read-write, and so forth. The metadata can be discoverable by other components, according to an aspect.

Figure 9:
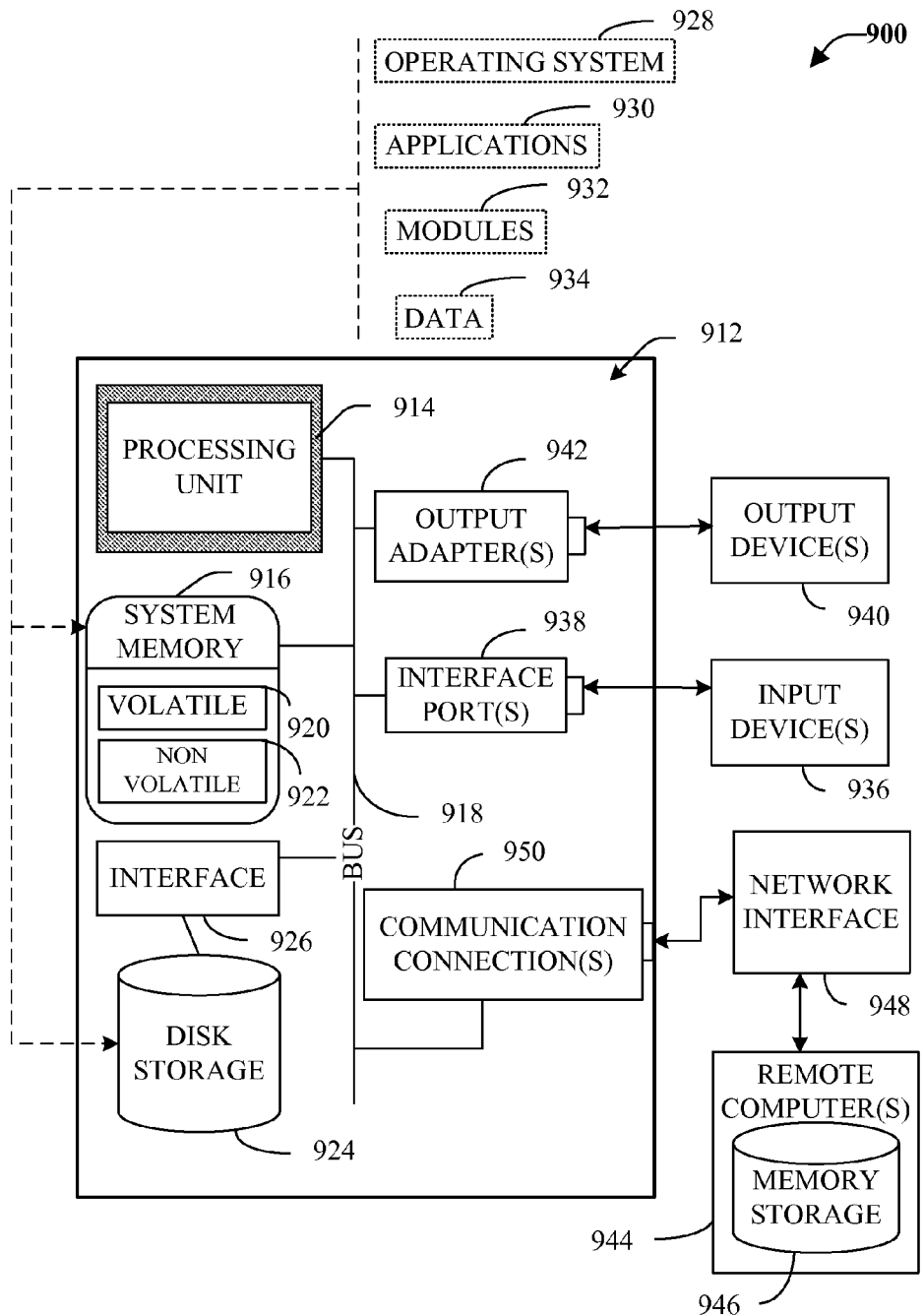
FIG. 9 illustrates a block diagram of a computer operable to execute the disclosed aspects.

Referring now to FIG. 9, illustrated is a block diagram of a computer operable to execute the disclosed system. In order to provide additional context for various aspects thereof, FIG. 9 and the following discussion are intended to provide a brief, general description of a suitable computing environment 900 in which the various aspects of the embodiment(s) can be implemented. While the description above is in the general context of computer-executable instructions that may run on one or more computers, those skilled in the art will recognize that the various embodiments can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments may also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the illustrative environment 900 for implementing various aspects includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1094 interface technologies. Other external drive connection technologies are within contemplation of the various embodiments described herein.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the illustrative operating environment, and further, that any such media may contain computer-executable instructions for performing the methods of the disclosed subject matter.

A number of program modules can be stored in the drives and RAM 912, including an operating system 930, one or more application programs 932, other program modules 934 and program data 936. All or portions of the operating system, applications, modules, and/or data can also be cached in the RAM 912. It is to be appreciated that the various embodiments can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1094 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are illustrative and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+Mbps in the 2.4 GHz band. Products can contain more than one band (e.g., dual band), so the networks can provide real-world performance similar to the basic 10BaseT wired Ethernet networks used in many offices.

Figure 10:
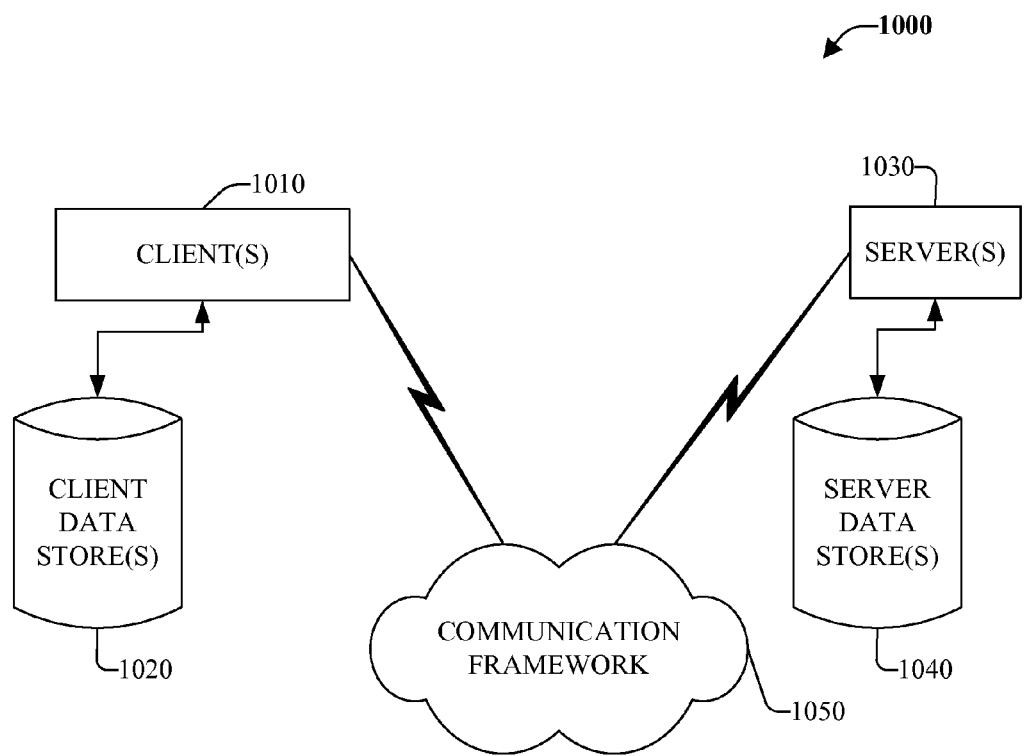
FIG. 10 illustrates a schematic block diagram of an exemplary computing environment, according to an aspect.

Referring now to FIG. 10, there is illustrated a schematic block diagram of an illustrative computing environment 1000 for processing the disclosed architecture in accordance with another aspect. The environment 1000 includes one or more client(s) 1002. The client(s) 1002 can be hardware and/or software (e.g., threads, processes, computing devices). The client(s) 1002 can house cookie(s) and/or associated contextual information in connection with the various embodiments, for example.

The environment 1000 also includes one or more server(s) 1004. The server(s) 1004 can also be hardware and/or software (e.g., threads, processes, computing devices). The servers 1004 can house threads to perform transformations in connection with the various embodiments, for example. One possible communication between a client 1002 and a server 1004 can be in the form of a data packet adapted to be transmitted between two or more computer processes. The data packet may include a cookie and/or associated contextual information, for example. The environment 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s)

1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

It is noted that as used in this application, terms such as "component," "module," "system," and the like are intended to refer to a computer-related, electro-mechanical entity or both, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process or thread of execution and a component may be localized on one computer or distributed between two or more computers, industrial controllers, or modules communicating therewith.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

The subject matter as described above includes various exemplary aspects. However, it should be appreciated that it is not possible to describe every conceivable component or methodology for purposes of describing these aspects. One of ordinary skill in the art may recognize that further combinations or permutations may be possible. Various methodologies or architectures may be employed to implement the subject invention, modifications, variations, or equivalents thereof. Accordingly, all such implementations of the aspects described herein are intended to embrace the scope and spirit of subject claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device, comprising:
a memory that stores instructions; and
a processor that facilitates execution of the instructions to at least:
obtain a set of alternative interface applications of an industrial automation system, wherein the set of alternative interface applications are associated with respective services that are decoupled from a platform configuration of the industrial automation system, and wherein the services comprise respective reusable definitions and a specification; and
enable a first interface application selected from the set of alternative interface applications based on information related to the first interface application.

2. The device of claim 1, wherein the processor further facilitates the execution of the instructions to maintain concurrent support for each interface application included in the set of alternative interface applications, wherein each interface application is a different interface version.

3. The device of claim 1, wherein the processor further facilitates the execution of the instructions to:
compare the interface applications in the set of alternative interface applications; and
enable a second interface application of the set of alternative interface applications based on a result of the comparison, wherein the second interface application replaces the first interface application.

4. The device of claim 1, wherein the processor further facilitates the execution of the instructions to switch implementation from the first interface application to a second interface application included in the set of alternative interface applications, wherein the first interface application is an updated version of the second interface application.

5. The device of claim 1, wherein the processor further facilitates the execution of the instructions to cross-reference a set of information between each interface application in the set of alternative interface applications, wherein each interface application represents a different revision level.

6. The device of claim 1, wherein the processor further facilitates the execution of the instructions to:
perform a compatibility check of each interface application in the set of alternative interface applications; and
obtain at least one of the interface applications as an updated version based on a determination that the compatibility check is approved.

7. The device of claim 1, wherein the processor further facilitates the execution of the instructions to enable a second interface application while maintaining concurrent support for the first interface application.

8. The device of claim 1, wherein the processor further facilitates the execution of the instructions to enable a second interface application from the set of alternative interface applications for testing during runtime,
wherein the second interface application is enabled without powering down the associated component in the industrial automation system.

9. The device of claim 1, wherein the processor further facilitates the execution of the instructions to display logic views that represent design and management of the industrial automation system.

10. The device of claim 1, wherein the processor further facilitates the execution of the instructions to display host views as a function of a user access level.

11. The device of claim 1, wherein the processor further facilitates the execution of the instructions to provide metadata related to an access level of the first interface application or a second interface application, wherein the access level is read access, write access, or read-write access.

12. A method, comprising:
receiving, by a system comprising a processor, a first interface application of an industrial automation system;
deploying, by the system, the first interface application within the industrial automation system;
obtaining, by the system, a second interface application, wherein the second interface application is a revision of the first interface application;
mapping, by the system, the second interface application to the first interface application comprising identifying differences between the first interface application and the second interface application;
enabling, by the system, the second interface application within the industrial automation system comprising disabling the first interface application; and
selectively resuming, by the system, operation of the industrial automation system with the first interface application based on a detection of a defined event.

13. The method of claim 12, wherein the enabling comprises retaining support for the first interface application and the second interface application concurrently.

14. The method of claim 12, wherein the enabling comprises performing a test of the second interface application during runtime of the industrial automation system.

15. The method of claim 12, wherein the mapping comprises storing information related to a first service of the first interface application and a second service of the second interface application, wherein the first service and the second service comprise respective reusable definitions and respective specifications comprising one or more resources.

16. The method of claim 12, wherein the obtaining comprises downloading an update that comprises the second interface application based on a determination that the second interface application is compatible with the first interface application.

17. The method of claim 12, further comprises providing, by the system, multiple views based on a user access level, wherein the multiple views are logic views or host views.

18. A system, comprising:
 a memory that stores instructions; and
 a processor that facilitates execution of the instructions to at least:
  retain concurrent support of a first interface application and a second interface application, wherein the second interface application is a revised version of the first interface application;
  obtain a third interface application and associated data;
  associate the third interface application with the second interface application based in part on the associated data; and
  enable the third interface application during runtime, wherein support of the first interface application and the second interface application are maintained concurrent with the support of the third interface application.

19. The system of claim 18, wherein the processor further facilitates the execution of the instructions to:
 disable the third interface application; and
 resume operation with the first interface application or the second interface application.

20. The system of claim 18, wherein the processor further facilitates the execution of the instructions to obtain the third interface application based on the third interface application being determined to be compatible with the first interface application or the second interface application.

* * * * *